May 26, 1931.  E. J. ABBE  1,807,269
INDUSTRIAL TRUCK
Original Filed Nov. 23, 1925  2 Sheets-Sheet 1
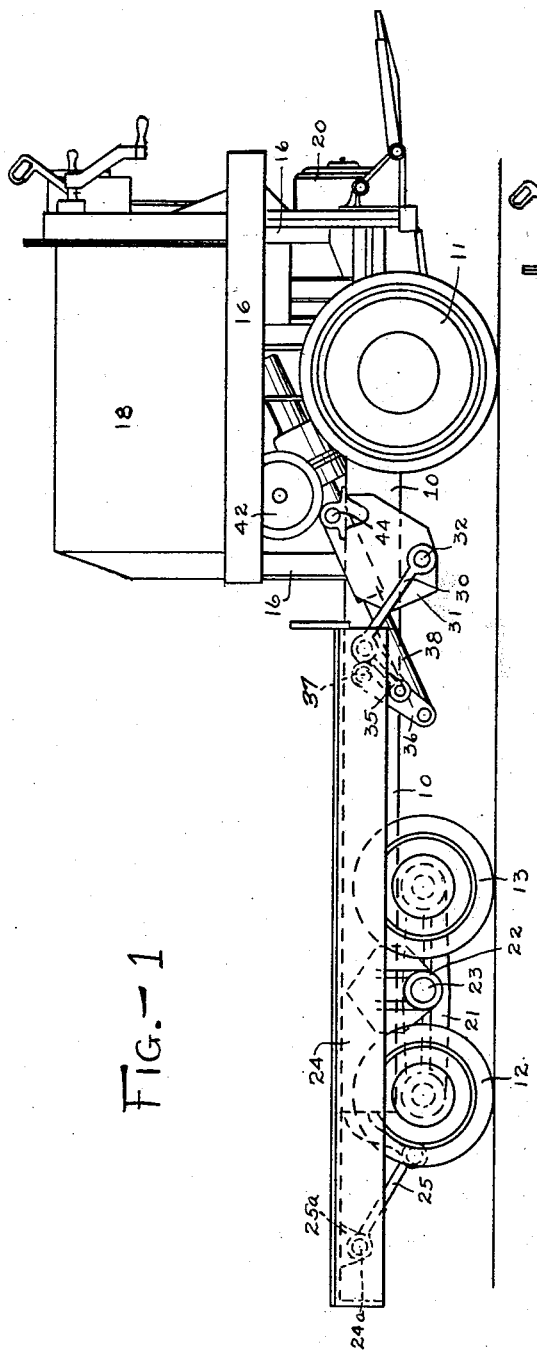
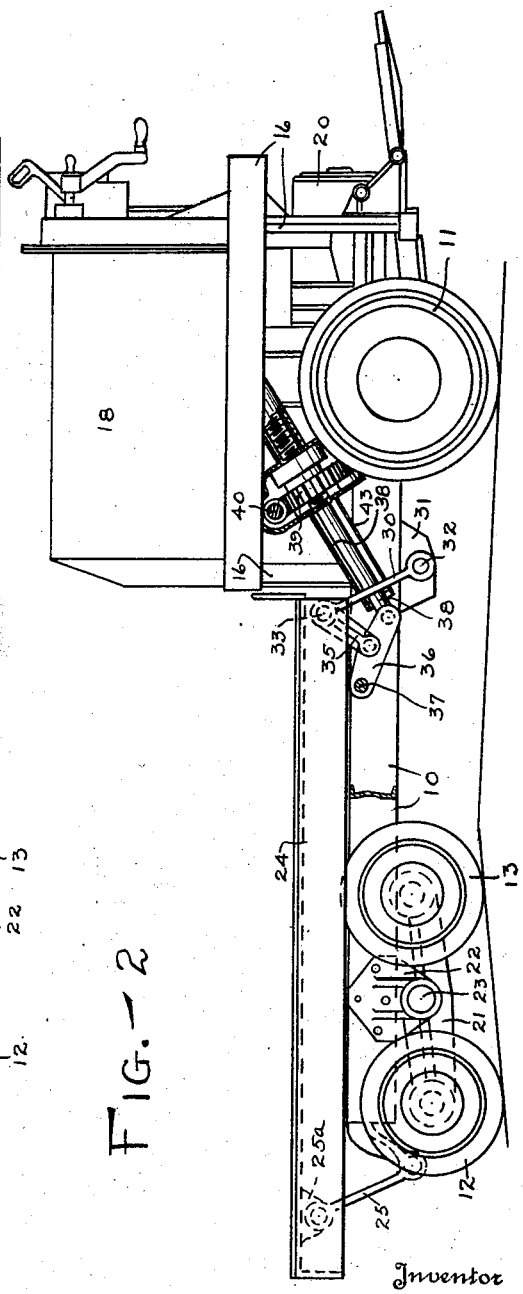
Inventor
Edward J. Abbe,
By Bates, Macklin, Golrick & Teare
Attorney

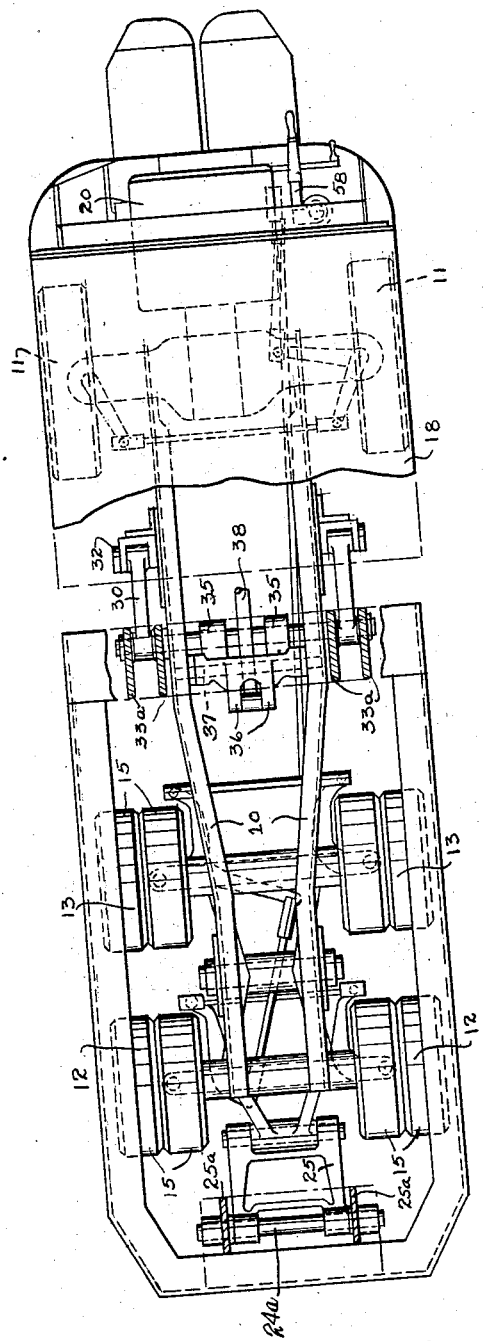

Patented May 26, 1931

1,807,269

UNITED STATES PATENT OFFICE

EDWARD J. ABBE, OF CLEVELAND, OHIO, ASSIGNOR TO THE ELWELL-PARKER ELECTRIC COMPANY, OF CLEVELAND, OHIO, A CORPORATION OF OHIO

INDUSTRIAL TRUCK

Original application filed November 23, 1925, Serial No. 70,744. Divided and this application filed January 11, 1928. Serial No. 245,979.

This invention is concerned with industrial trucks and has for its general object the provision of an automotive truck of the elevating platform type which is adaptable to the raising, lowering and transporting of extraordinarily heavy loads. This application is a division of my application, Serial No. 70,744 filed November 23, 1925.

A more specific object of my invention is the provision of an industrial truck embodying novel features of construction whereby the weight of an extremely heavy load may be readily raised and lowered without undue strain on the truck frame, and without necessitating the provision of an undue amount of storage battery capacity. Other objects of my invention will hereinafter become more apparent from the following description illustrating a preferred embodiment thereof. The essential characteristics of my invention are summarized in the claims.

Industrial trucks have now become standard equipment in the manufacturing, mercantile and transportation industries and have taken a variety of forms to meet the peculiar needs of the particular industry in which they are to be used. There are certain types of these industrial trucks, however, which are more adaptable to universal use than other types and this type is known as the load elevating platform type wherein a load elevating platform is embodied in such a manner as to be disposed at a low level relative to the supporting surface of the truck. Trucks of the latter type have been more or less limited in their load carrying capacity due to the fact that the available space for wheels, chassis, etc. has been restricted to meet designed conditions determined by the utility demand upon the truck.

My invention contemplates a truck construction of the load elevating platform type which may be utilizable for the raising, lowering and transporting of extremely heavy loads and the particular form of truck shown in the drawings has been built for and is capable of handling a ten ton load and in accomplishing this I have retained in the truck design those features which are directed to a wide range of utility and ready manipulation.

Fig. 1 is a side elevation.
Fig. 2 is a side elevation, partly in section.
Fig. 3 is a plan view, partly in section.

As shown in the drawings, the truck comprises a chassis or frame 10 having mounted upon its fore end a pair of driving wheels 11, and adjacent its rear end two pairs of small wheels 12 and 13. These wheels may be of sufficient width to afford a suitable mounting for tires 15 whereby each tire may be movable relative to the other. Extending upwardly from the forward end of the chassis 10 is a frame structure generally indicated at 16, which constitutes a support for a battery and a casing 18. Disposed beneath the battery casing 18 is a motor 20 which is drivingly connected to the forward wheels 11 in a manner described by my application, Serial No. 70,744.

The small pairs of wheels 12 and 13 and the forward pair of driving wheels 11 are all mounted to be turnable relative to the truck chassis, the small wheels 12 and 13 being mounted upon a sub-frame 21 which is pivotally attached to a transverse bar 23 supported by depending brackets 22 secured to the chassis 10. A load elevating platform 24 surmounts the rear portion of the chassis frame and is attached thereto at its rear end by a link frame 25 (see Figs. 1 and 3) in any suitable manner such as pins and brackets generally indicated at 24a and 25a respectively, and at its forward end by a toggle mechanism. This toggle mechanism as shown in Figs. 2 and 3 may comprise a pair of links 30 attached at their lower ends to plates 31 by pins 32. The plates 31 may be attached to the side bars of the chassis 10 and depend therefrom. The upper ends of the links 30 are attached to the elevating platform 24 by a bar 33 which is secured to suitable brackets 33a depending from the under side of the platform. Disposed intermediate the chassis bars is a second link frame 35 connected at its upper end to the platform by the bar 33, and at its lower end to a link frame 36 at a point intermediate the ends of the latter member. The link frame 36 has one end thereof attached to the chassis side bars by a transverse bar 37, while the other end thereof is attached to a threaded rod 38. The rod has mounted thereon a worm gear 39, the hub of which comprises a nut engaging the threads formed on the rod 38. The worm gear is actuated by a worm 40 and the latter may be mounted upon the shaft of a motor 42. The motor 42 may be connected to the battery within the housing 18 and be controlled by suitable mechanism disposed at the forward, operator's end of the truck. When the screw rod 38 is retracted or drawn upwardly on the toggle mechanism described, the elevating platform 24 is raised and the rod 38 will have a swinging movement. The motor 42, worm gear, etc., are accordingly mounted in a casing 43 which may be pivotally mounted as shown at 44 (see Fig. 1) to permit the rod 38 to swing.

As shown in Fig. 3, the chassis side bars of the chassis frame converge toward each other at the rear end of the truck beneath the platform whereby the upper portions of the small wheels 12 and 13 may be disposed between the side flanges 24a of the elevating platform and the chassis frame, thus affording an extremely low drop of the elevating platform. The sub-frame 21 upon which the four small wheels are mounted may comprise an ingrally formed structure with forked or bifurcated branches (see Fig. 3), to which may be attached wheels or axle spindles. Suitable steering and propelling mechanism is provided as shown in my application, Serial No. 70,744. From the foregoing description it will be seen that I have provided a platform lift truck adapted to raise heavy loads from the floor and support them without undue strain on the truck or raising mechanism. Also that this operation does not require an excessive amount of storage battery capacity.

I claim:

1. In an industrial truck, a chassis, a load lifting platform mounted on the chassis, and means for actuating said load lifting platform, said means including a power actuated draw-bar, a pair of toggle links, one of said links being pivoted at one of its ends to the chassis, and at its other end to said power actuated draw-bar, the other of said links being pivoted to the load lifting platform and to the first of said links at a point intermediate the ends of the first of said links.

2. In an industrial truck, a chassis, a load lifting platform mounted on the chassis, and means for actuating said load lifting platform, said means including a power actuated draw-bar, a link pivoted at the opposite ends thereof to said draw-bar and to the chassis, and another link pivoted to the load-lifting platform and to the first of said links at a point intermediate the ends of said first link.

3. In an industrial truck, a chassis, a load-lifting platform mounted on the chassis, and means for actuating said load lifting platform including parallel links pivoted to the chassis and to a bar mounted on the lifting platform, a pair of toggle links, one end of one of said links being pivoted to the chassis, the other of said links being pivoted to the bar and to said first link at a point intermediate the ends of said first link, and a power actuated draw-bar pivoted to said first link at the end thereof remote from the chassis.

4. In an industrial truck having a chassis, a load lifting platform mounted on the chassis, said chassis comprising a main frame having an upright housing at one end and a low swung frame portion extending forwardly therefrom adjacent the ground, said lifting platform being disposed over said low swung portion of the main frame, and a motor; a platform actuating means driven by the motor comprising a draw bar, a lever pivotally attached to the draw bar and to the low swung portion of the frame, a second lever attached to the platform and to the first lever and parallel links connecting the platform to the chassis.

5. In an industrial truck having a chassis and a load lifting platform mounted on the chassis, said chassis comprising a main frame having an upright housing at one end and a low swung frame portion extending forwardly therefrom adjacent the ground, said lifting platform being disposed over said low swung portion of the main frame and connected thereto by parallel links; platform actuating means comprising a motor disposed on a pivotal mounting, a jack screw, a mounting supporting the jack screw, and a toggle mechanism operatively interposed between the jack screw and the platform, including a transversely extending bar forming pivotal connections for said links and said toggle mechanism to the platform.

6. In an industrial truck having a chassis and a load lifting platform mounted thereon, said chassis comprising a main frame having an upright housing at one end and a low swung frame portion extending forwardly therefrom adjacent the ground, said lifting platform being disposed over said low swung portion of the frame, and a motor disposed within the upright housing; means for actuating said lifting platform including a single link at one end of the frame and a pair of links at the other end of the frame for connecting the lifting platform to the low swung portion of the frame, a gear reduction means driven by the motor and a compound lever means attached to the platform and the gear reduction means and the low swung portion of the frame for operating the platform, including a transverse bar connecting said pair of links, and the compound lever means to the platform.

7. In an industrial truck having a chassis and a load lifting platform mounted on the chassis; means for actuating said lifting platform, said means including a pair of toggle links, one of said links being pivoted to the chassis and the other of said links to the lifting platform, means for actuating said toggle links pivotally connected to one end of one of said links, the link to which said actuating means is connected being connected at a point intermediate its ends to one end of the other of said links.

In testimony whereof, I hereunto affix my signature.

EDWARD J. ABBE.